THOMAS & MAST.
Fertilizer.
No. 47,138.  Patented Apr. 4, 1865.
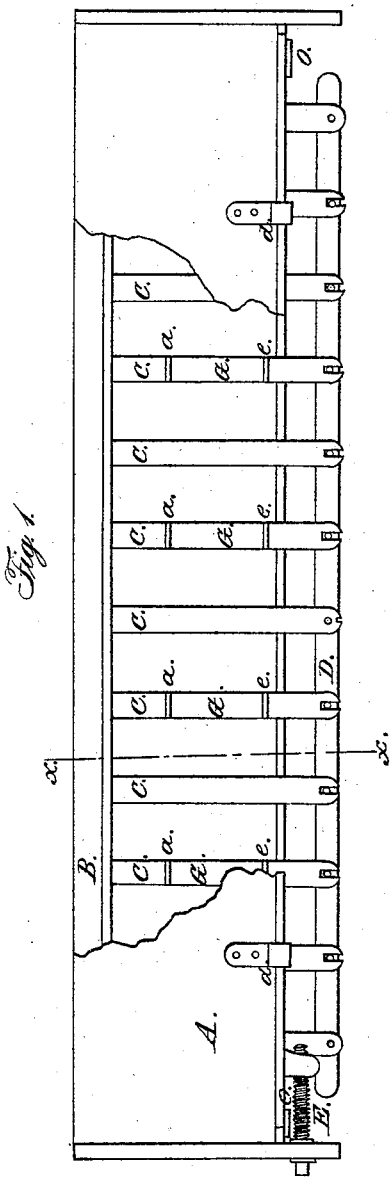
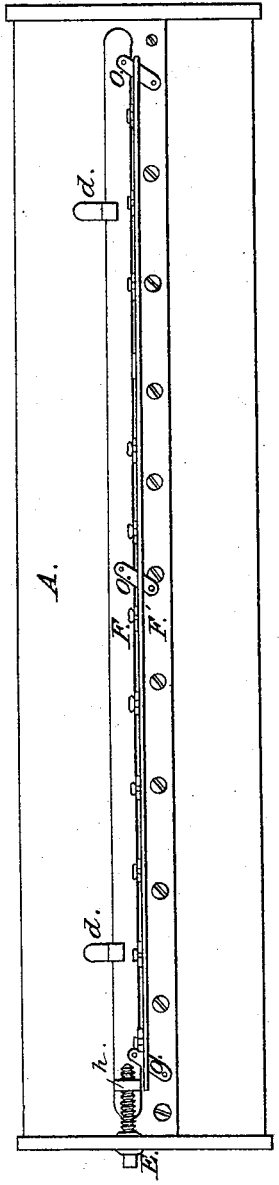
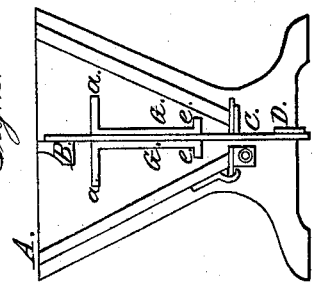
Witnesses:
E. R. McKean
P. T. Dodge
Inventor:
J. H. Thomas &
P. P. Mast
By Smith & Dodge
attys

UNITED STATES PATENT OFFICE.

J. H. THOMAS AND P. P. MAST, OF SPRINGFIELD, OHIO.

IMPROVED MACHINE FOR DISTRIBUTING FERTILIZERS.

Specification forming part of Letters Patent No. 47,138, dated April 4, 1865.

*To all whom it may concern:*

Be it known that we, J. H. THOMAS and P. P. MAST, of Springfield, in the county of Clarke and State of Ohio, have invented certain new and useful Improvements in Machines for Distributing Fertilizing Substances; and we do hereby declare that the following is a full, clear, and exact description thereof, reference being had to the accompanying drawings, making part of this specification, and to the letters of reference marked thereon.

Figure 1 is a side elevation, with a portion of the case broken away for the purpose of showing the interior. Fig. 2 is a transverse section taken in the line $x\ x$ of Fig. 1, and Fig. 3 is a bottom plan view.

The nature of our invention consists in a hopper provided with a series of oscillating stirrers arranged in a novel manner for distributing the fertilizing material.

To enable others skilled in the art to construct and use our invention, we will proceed to describe it.

A represents the hopper, which may be mounted on wheels in any suitable manner. The sides of the hopper are made converging, as shown, with the bottom left open. A bar, B, extends the entire length of the hopper at the top, resting on the end pieces thereof, as shown. To this bar B is pivoted a series of flat metal strips, C, which are of a suitable length to project through the open bottom of the hopper, as shown in Figs. 1 and 2. To the sides or faces of these flat strips C are secured shorter strips of metal G, having their ends bent at a right angle, and thus forming the projecting stirrers or arms $a$ and $e$, the upper arms, $a$, being longer than the lower ones, $e$, as shown; but one piece G is attached to each strip C, they being arranged alternately, so that on one piece they shall project on one side and on the next, in an opposite direction, on the other side. Below the bottom of the hopper the strips C are pivoted to a metallic bar, D, as shown in Fig. 1. To the bottom of the hopper, on one side of the strip C, is rigidly secured a flat metallic plate, F', and on the opposite side a similar strip, F, is secured in such a manner that it may be moved a short distance both longitudinally and laterally, it being secured at its outer edge by the clips $d$. The bottom pieces, F and F', are united by the cross-strips $o$, which are pivoted loosely at each end, as shown in Fig. 2. A stud, $h$, projects from the movable bottom piece, F, through which a screw-bolt, E, passes, said bolt being held at or near its opposite end by suitable flanges in the end piece of the hopper A, and having its end which projects outside of said end piece made square to receive a handle or wrench for turning it. By operating the screw E the loose bottom piece, F, will be shoved endwise; but as it is connected by the cross-pieces $o$ to the stationary bottom piece, F', it obvious that it will also be drawn toward F' at the same time, whereby it will be made to close the opening at the bottom, the pieces F and F' operating like a parallel rule.

Motion is imparted to the bar D by any suitable connection with the wheels or mechanism of the vehicle upon which the hopper may be mounted in such a manner as to give it, and consequently the strips C and stirrers $a$ and $e$, a to-and-fro movement, by which the material in the hopper is kept in a constant state of agitation, and is gradually and regularly fed out through the opening between the bottom plates, F and F'. By means of the screw E this opening may be increased or decreased in size at pleasure, and thus the quantity of material distributed can be regulated as desired, and by shoving the slide F close up against the strips C and disconnecting the bar D from the driving mechanism the feed may be shut off entirely, the space left between the slide F and plate F' being only equal to the thickness of the flat strips C, which, being made of thin bars or strips, leaves so small a space that the material will not pass through.

By these means we are enabled to produce a very cheap and efficient apparatus for distributing lime, plaster, ashes, and all similar fertilizers. By constructing the metallic portions of thin flat bars we can cut and punch them cold, and thereby avoid the use of fire, drilling-machines, &c., in their construction. This distributer is specially designed for use in connection with grain-drills made by us, the seeding apparatus being removed and this substituted in its place and operated by the same mechanism that operates the seed-slides, and thus we enable the farmers to make one set of running-gear answer both purposes, whereby much saving is effected.

Having thus described our invention, what we claim as new, and desire to secure by Letters Patent, is—

1. The slats or strips C, suspended from the bar B and projecting down through the opening in the bottom of the hopper A, when connected at the bottom by bar d, substantially as and for the purposes set forth.

2. The slats C, provided with the projections a and e, as and for the purpose described.

3. The slats C, as arranged in combination with the bar D and bottom pieces F and F', as and for the purpose set forth.

P. P. MAST.
J. H. THOMAS.

Witnesses:
W. C. DODGE,
B. HOLTZ,
WILLIAM ENOCH.